2,735,819

MANUFACTURE OF CATION EXCHANGE MATERIAL FROM COAL

Martinus L. Goedkoop, Geleen, Netherlands, assignor to Stamicarbon N. V., Heerlen, Netherlands No Drawing. Application December 26, 1951,
Serial No. 263,515

Claims priority, application Netherlands
December 29, 1950

7 Claims. (Cl. 252—179)

This invention relates to the manufacture of cation exchange materials from carbonaceous solid substances, such as coal, semicoke, precarbonized peat and lignite.

FIELD OF INVENTION

It has previously been found that cation exchange materials of a very useful nature can be prepared in a rather simple manner from carbonaceous solid substances, such as bituminous coal, anthracite and precarbonized lignite and peat or the like, by heating the carbonaceous material in oxygen or in a free oxygen-containing gas at a temperature within the range of 80–450° C., and then hydrolyzing the reaction product in a mildly alkaline medium. Such a process is disclosed in my copending application Serial No. 177,764, filed August 4, 1950, now U. S. Patent No. 2,693,452 of November 2, 1954, which, as a typical example, describes the production of a desirable cation exchange material by heating anthracite or the like for twenty-four hours at a temperature of 325° C. in a medium of air which is passed through the anthracite at a rate of 25 liters per minute. The resulting reaction product is thereafter suspended in sodium hydroxide and the suspension boiled to effect hydrolysis, after which the hydrolyzed product is made ready for use by washing. In place of air, any oxygen-containing gas may be used in the heat treatment of the anthracite or other solid carbonaceous material according to the process of Serial No. 177,764. Similarly, aqueous alkaline solutions other than sodium hydroxide, for example, potassium hydroxide or the salts of weak acids can be used as the hydrolyzing medium. Various techniques may be used for heating the carbonaceous material within the desired range of 80° C. to 450° C. but, preferably, heating is effected, as indicated above, by passing the oxygen-containing gas through the material while the latter is maintained in a fluidized state.

It has also been proposed to improve the procedures described in the above mentioned Serial No. 177,764 by utilizing as the free oxygen-containing gas, one which also contains a nitrous vapor. Improved procedures of this type are described in my copending application, Serial No. 216,097, filed March 16, 1951, now U. S. Patent No. 2,693,453 of November 2, 1954, wherein nitrous vapors, such as nitric acid vapors, or other gases containing nitric oxide or other nitrogen oxides, are added to the oxygen-containing gas in the presence of which the carbonaceous material is heated. The nitrous vapors, according to the invention described in Serial No. 216,097, may be used in varying amounts although, preferably, constitute less than 10% by volume of the oxidizing gas mixture.

It has now been found that the cation exchange materials obtained by the procedures described in the co-pending applications referred to above can be improved by treating the materials in solid form with an acid which brings about a considerable decrease in the volume of the exchanger while the capacity of exchanging cations (i. e. the total weight capacity of the exchanger) after the treatment is at least equal, and generally somewhat superior, to the weight capacity of the materials before the acid-treatment. Consequently the decrease in volume means an increase in the capacity per unit of volume, which is an important technical advantage since, as a result of the higher volume capacity, a smaller apparatus may suffice or the given filling of a column may be used for a longer time before regeneration becomes necessary.

OBJECTS

A principal object of this invention is the provision of new improvements in the manufacture of cation exchange materials from solid carbonaceous substances.

A more specific object of the invention is the provision of improvements in the method of making cation exchange materials by heating carbonaceous solid substances in oxygen-containing gases and then hydrolyzing the reaction product in an alkaline medium whereby the capacity by volume of the said cation exchange materials is increased.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

GENERAL DESCRIPTION

These objects are accomplished according to the present invention by a process which comprises an acid-treatment of the cation exchange material which is obtained from subdivided solid carbonaceous material in accordance with the procedures described in the above mentioned patents, i. e., by heating the said carbonaceous material in a stream of free oxygen-containing gas to a temperature between 80 and 450° C. and subsequently hydrolyzing the reaction product in an alkaline medium.

DETAILED DESCRIPTION

For the acid treatment, any strong mineral or organic acid may be used, provided the acid is of sufficient strength to decrease the volume of the exchange material, and, under its conditions of use, is non-oxidizing and non-water absorbing. The acid may be used either in dilute or concentrated form, although the more concentrated the acid, the more rapidly will the decrease in volume be effected.

Typically suitable acids are hydrochloric, phosphoric or acetic acid, either in dilute or concentrated form. Likewise, dilute sulfuric acid, for instance, 40% sulfuric acid, may be used, but concentrated solutions thereof, e. g., 98% sulfuric acid, and nitric acid, whether dilute or concentrated, are not suitable for use because they have water absorbing and oxidizing actions which are fatal to the good properties of the ion exchange material. It is not recommendable to use strongly diluted or too weak acids, because in that case large volumes of acid solution would have to be employed.

Therefore it is advantageous to carry out the treatment with acid solutions having a pH-value lower than 2.

While any strong mineral or organic acid which is of sufficient strength to decrease the volume of the exchange material and does not demonstarte water adsorbing and oxidizing actions may be used, hydrochloric acid, because of its low cost, is most conveniently employed. In this case it has been found that 100 milliliters of 38% hydrochloric acid or one liter of 1 N hydrochloric acid per liter of ion exchanger with a capacity of about 1000 mg. eq. CaO/liter will give a desirable effect. If an ion exchanger with a greater or smaller capacity is employed, proportionally more or less acid is required, provided the cation exchanger be treated with not too diluted or too weakly acid solutions.

The temperature employed for effecting the acid treatment and the duration of this treatment may also be widely varied. Preferably, the acid treatment is carried out at normal temperatures, but higher temperatures may also be employed. In the latter case, however, the treatment periods should be somewhat shorter than those employed when using normal temperatures, since prolonged contact of the exchange material with acids at temperatures above 60–70° C., particularly when using acids of relatively high concentrations, may result in disintegration of the exchange material.

The acid treatment should be carried out for a period of time sufficient to bring about an effective decrease in the volume of the exchange materials. Needless to say, care should be taken to insure that the contact period is not prolonged to the point where disintegration takes place. Generally speaking, the treatment is continued until the exchanger is practically complete converted into its hydrogen-ion exchanging form whereby the decrease in volume amounts to from about 15–25% of the original volume of exchange material, or, stated in another way, the grain size of the acid-treated material is about 75–85% of the grain size of the coal or other carbonaceous starting material. In such cases, the total increase of the volume capacity of the exchange material amounts to about 20–35%, since the total weight capacity of the exchanger is a little higher than the total weight capacity before the acid treatment.

It should be pointed out that, in contradistinction to the total capacity, the break-through capacity of the exchanger in its hydrogen-ion exchanging form is lower than the capacity of the original ion exchanger in its neutral form. However, by transferring the exchanger, after the acid treatment, in a known manner from its hydrogen-ion exchanging form into the neutral so-called salt form, a break-through capacity per weight at least equal to that of the original material is obtained.

The transfer of the exchanger from the hydrogen-ion exchanging form into the salt form may be carried out by washing with a neutral or weakly alkaline salt solution such as, for instance, a solution of sodium carbonate or sodium acetate.

Liquids showing a stronger alkaline reaction should not be used, as this also causes a swelling of the exchanger so that the advantage obtained by the acid-treatment is lost again.

Alternatively, the ion exchanger may be obtained in the salt form by first washing it in the hydrogen-ion exchanging form with water of a certain hardness, by which treatment the exchanger is charged with calcium, and subsequently regenerating it with a salt solution.

EXAMPLES

A more complete understanding of the improvement attained by this invention may be had by reference to the following examples.

It should be noted that the capacities mentioned in these examples are measured as "break-through" capacities by passing water with a hardness of 17.7° (=177 mg. CaO/liter) over the exchanger at a rate of five times the volume of the exchanger.

Example I

From non-bituminous coal a cation exchanger was prepared according to the method described in the specification of U. S. Patent No. 2,693,452, in which the coal was heated in air at 350° C. for 24 hours, and thereafter hydrolyzed in an alkaline medium.

After charging with Ca ions and regenerating with the NaCl solution, the exchanger was found to have a constant capacity of 1350 mg. eq. CaO/kg. exchanger corresponding to a capacity of 520 mg. eq CaO/liter exchanger. One liter of this exchanger was treated with 1 N hydrochloric acid, which caused the volume to decrease to 0.85 liter; thus the capacity amounted to 950 mg. eq. CaO/kg.

After the exchanger had been completely converted into the Na form by means of an NaCl solution, in which process the volume had not changed, the capacity was 1410 mg. eq. CaO/kg. This corresponds to a capacity of 640 mg. eq. CaO/liter. Consequently, the acid treatment brought about an increase in capacity by volume of 23%.

Example II

From the same non-bituminous coal as used in Example I, a cation exchanger was prepared according to the method described in U. S. Patent No. 2,693,452, in which the coal was heated in an air stream at 375° C. for 24 hours and thereafter hydrolyzed in an alkaline medium.

After charging with Ca ions and regenerating with an NaCl solution, a constant capacity of 1850 mg. eq. CaO/kg, corresponding to a capacity of 740 mg eq. CaO/liter was measured. The exchanger was immersed in 38% HCl, which caused the volume to decrease by 23%.

After the ion exchanger had been converted into the Na from by means of an NaCl solution, the capacity was 1900 mg. eq. CaO/kg. This corresponds to a capacity of 985 mg. eq. CaO/liter. Consequently, the increase in capacity by volume amounted to 33%.

Example III

From semi-bituminous coal a cation exchanger was prepared according to the method of U. S. Patent No. 2,693,452, in which the coal was heated in an air stream at 350° C. during 20 hours and thereafter hydrolyzed.

After charging with Ca ions and regenerating with NaCl, a constant capacity of 2010 mg. eq. CaO/kg., corresponding to a capacity by volume of 745 mg. eq. CaO/liter was attained.

By treating the exchanger with 1 N sulfuric acid the volume decreased by 21.5%.

Subsequently the exchanger, which was in H form, was washed with a soda solution and in this process was converted into the salt form; it appeared that the volume had not changed. The capacity of the ion exchanger obtained in this way was then 2120 mg. eq. CaO/kg., which corresponds with a capacity by volume of 1000 mg. eq. CaO/liter, so the increase in capacity by volume amounted to 34%.

Example IV

From the same semi-bituminous coal as used in Example III a cation exchanger was prepared according to the method of U. S. Patent No. 2,693,452, in which case the coal was heated in an air stream at 350° C. for 24 hours, and thereafter hydrolyzed in an alkaline medium. After charging with Ca ions and regenerating in the Na form a constant capacity of 2310 mg. eq. CaO/kg. was attained, corresponding to a capacity by volume of 856 mg. eq. CaO/liter.

The ion exchanger was immersed in 4 N sulfuric acid, which caused the volume to decrease by 22.0%.

By washing with a soda solution the ion exchanger was converted from the H form into the Na form. Now the capacity proved to be 2400 mg. eq. CaO/kg., corresponding to a capacity by volume of 1140 mg. eq. CaO/liter, so that an increase in capacity by volume of 34% had been attained.

It will be appreciated that, while the foregoing examples are all concerned with the treatment of cation exchange materials obtained with the methods described in U. S. Patent No. 2,693,452, materials derived from the methods of U. S. Patent No. 2,693,453 may also be treated in accordance with the present invention with equally good results.

CONCLUSIONS

Through the use of the new procedures, as described above, it is possible to make cation exchange materials cheaply and easily from readily available basic materials, such as coal, semicoke, precarbonized lignite or precarbonized peat or the like. The products are obtained in desirable size and in a simple manner. One of the main advantages derived by the new improvement is the reduction in volume which may amount to about 25% of the volume of the original exchange material, and consequential increase of the volume capacity of the produced cation exchange material.

I claim:

1. In the production of cation exchange material from coal by a process which comprises heating, in a medium of a free oxygen-containing gas and at a temperature within the range of from 220° to 350° C. said coal which is oxidizable but not completely decomposable under the conditions employed and which is of about 0.2 to 1 mm. particle size, continuing said heating until said material is oxidized, subsequently hydrolyzing the oxidized product by treatment thereof with a hot aqueous strongly alkaline solution and thereafter separating the hydrolyzed product from said solution, the time of heating the initial coal being such that the particle size of the cation exchanger is substantially the same grain size as that of the starting material, the improvement whereby cation exchangers of increased capacity by volume are obtained, which comprises immersing said cation exchanger in solid form in an acid which is non-oxidizing and non-water adsorbing under conditions of use and is of sufficient strength to decrease the volume of said solid exchanger and continuing said treatment until the volume of said exchange material has been decreased by about 15% to 25%.

2. The process of claim 1, wherein the coal is a semi-bituminous coal.

3. The process of claim 1, wherein the coal is an anthracite coal.

4. The process of claim 1, wherein the acid is sulfuric acid.

5. The process of claim 1 wherein said acid is hydrochloric acid.

6. The process of claim 1 wherein the pH-value of said acid solution is lower than 2.

7. The process of claim 1 wherein the solid product is washed prior to said acid treatment to remove any alkaline solution absorbed therein during hydrolysis.

References Cited in the file of this patent

UNITED STATES PATENTS

| 2,309,363 | Urbain et al. | Jan. 26, 1943 |
| 2,312,449 | Shoemaker et al. | Mar. 2, 1943 |

FOREIGN PATENTS

| 547,580 | Great Britain | Sept. 2, 1942 |